US007472107B2

(12) United States Patent
Agrawal et al.

(10) Patent No.: US 7,472,107 B2
(45) Date of Patent: Dec. 30, 2008

(54) INTEGRATING HORIZONTAL PARTITIONING INTO PHYSICAL DATABASE DESIGN

(75) Inventors: Sanjay Agrawal, Redmond, WA (US); Surajit Chaudhuri, Redmond, WA (US); Vivek Narasayya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 10/601,416

(22) Filed: Jun. 23, 2003

(65) Prior Publication Data

US 2004/0260684 A1 Dec. 23, 2004

(51) Int. Cl.
*G06F 17/30* (2006.01)

(52) U.S. Cl. .......................... 707/2; 707/3; 707/104.1

(58) Field of Classification Search ................. 709/226, 709/230, 217; 707/2, 3, 100, 102, 104.1, 707/200, 206

See application file for complete search history.

(56) References Cited

U.S. PATENT DOCUMENTS

| 5,758,345 | A | * | 5/1998 | Wang ......................... 707/100 |
| 5,864,842 | A | * | 1/1999 | Pederson et al. ............... 707/3 |
| 5,960,194 | A | * | 9/1999 | Choy et al. .................. 707/102 |
| 6,223,171 | B1 | * | 4/2001 | Chaudhuri et al. ............. 707/2 |
| 6,226,658 | B1 | | 5/2001 | Smith |
| 6,269,375 | B1 | * | 7/2001 | Ruddy et al. ................. 707/101 |
| 6,366,903 | B1 | | 4/2002 | Agrawal et al. |
| 6,453,314 | B1 | * | 9/2002 | Chan et al. ...................... 707/3 |
| 6,922,700 | B1 | * | 7/2005 | Aggarwal et al. ......... 707/104.1 |
| 6,941,316 | B2 | * | 9/2005 | Venkatesh et al. ........... 707/101 |

| 2004/0243618 | A1 | * | 12/2004 | Malaney et al. ............. 707/102 |

OTHER PUBLICATIONS

Jun Rao and Chun Zhang and Guy Lohman and Nimrod Megiddo. "Automating Physical Database Design in a Parallel Database"; Proceedings of the 2002 ACM SIGMOD International Conference on Management of Data; pp. 558-569; 2002.*
Agrawal, R., Ramakrishnan, S. *Fast Algorithms for Mining Association Rules*. Proc. of VLDB 1994.
Agrawal, S., Chaudhuri, S., and Narasayya, V. *Automated Selection of Materialized Views and Indexes for SQL Databases*. Proceedings of VLDB 2000.
Ailamaki, A., DeWitt D.J., Hill M.D., and Skounakis M. *Weaving Relations for Cache Performance*. VLDB 2001.
Chaudhuri, S., and Narasayya, V. *An Efficient, Cost-Driven Index Selection Tool for Microsoft SQL Server*. VLDB 1997.

(Continued)

*Primary Examiner*—Tim Vo
*Assistant Examiner*—Dangelino N Gortayo (57) ABSTRACT

Integrating the partitioning of physical design structures with the physical design process can result in more efficient query execution. When candidate structures are evaluated for their relative benefit, one or more partitioning methods is associated with each structure so that the benefits of various partitioning methods are taken into consideration when the structures are selected for use by the database. A pool of partitioned candidate structures is formed by proposing and evaluating the benefit of candidate structures with associated partitioning on a per query basis. The selected partitioned candidates are then used to construct generalized structures with associated partitioning methods that are evaluated for their benefit over the workload. Those generalized structures are added to the pool of partitioned candidate structures. From this augmented pool of partitioned candidate structures, an optimal set of partitioned structures is enumerated for use by the database system.

62 Claims, 4 Drawing Sheets

OTHER PUBLICATIONS

Chaudhuri, S., and Narasayya, V. *AutoAdmin "What-if" Index Analysis Utility*, Proc. of ACM SIGMOD 1998.

Chaudhuri, S., and Narasayya, V. *Index Merging*. Proceedings of ICDE 1999.

Cornell D.W., Yu P.S. *An Effective Approach to Vertical Partitioning for Physical Design of Relational Databases*. IEEE Transactions on Software Engg, vol. 16, No. 2, 1990.

De P., Park J.S., and Pirkul H. *An Integrated Model of Record Segmentation and Access Path Selection for Databases*. Information Systems, vol. 13, No. 1, 1988.

Navathe S., Ra M. *Vertical Partitioning for Databases Design: A Graphical Algorithm*. Proc. of SIGMOD 1989.

Rao, J., Zhang, C., Lohman, G., and Megiddo, N. *Automating Physical Database Design in a Parallel Database*. Proceedings of the ACM SIGMOD 2002.

Ramamurthy R., DeWitt D.J., and Su Q. *A Case for Fractured Mirrors*. Proceedings of VLDB 2002.

Sacca D., and Wiederhold G. *Database Partitioning in a Cluster of Processors*. ACM TODS, vol. 10, No. 1, Mar. 1985.

Serna, M., Trevisan L., and Xhafa, F. *The (Parallel) Approximability of Non-Boolean Satisfiability Problems and Restricted Integer Programming*. Proc. of the $15^{th}$ Annual Symposium on Theoretical Aspects of Comp. Sc, Lecture Notes in Comp. Sc. 1373, Springer Verlag, 1998. pp. 488-498.

Stohr T., Martens H., and Rahm E. *Multi-Dimensional Database Allocation for Parallel Data Warehouses*. Proceedings of VLDB 2000.

Valentin, G., Zuliani, M., Zilio, D., and Lohman, G. *DB2 Advisor: An Optimizer Smart Enough to Recommend Its Own Indexes*. Proceedings of ICDE 2000.

Zeller, B., and Kemper, A. Experience Report. *Exploiting Advanced Database Optimization Features for Large-Scale SAP R/3 Installations*. Proceedings of VLDB 2002.

Zilio, D. *Physical Database Design Decision Algorithms and Concurrent Reorganization for Parallel Database Systems*. PhD Thesis, Dept. of Comp. Sc., Univ. of Toronto, 1998.

Zilio, D., Jhingran, A., Padmanabhan, S. *Partitioning Key Selection for a Shared-Nothing Parallel Database System*. IBM Research Report RC 19820. 1994.

Gray, J. *DBGen Synthetic Data Generator for SQL Tables and Text files on Windows Platforms*. http://www.research.microsoft.com/~gray/dbgen/, Dec. 1999.

Gupta H., Harinarayan V., Rajaramana A., and Ullman J.D. *Index Selection for OLAP*. Proc. ICDE 1997.

\* cited by examiner

INTEGRATING HORIZONTAL PARTITIONING INTO PHYSICAL DATABASE DESIGN

TECHNICAL FIELD

The invention relates generally to the field of relational databases and specifically to the field of optimizing database physical design.

BACKGROUND OF THE INVENTION

Horizontal partitioning is an important aspect of physical database design that has significant impact on performance. Horizontal partitioning allows access methods such as tables, indexes and materialized views to be partitioned into disjoint sets of rows that are physically stored and accessed separately. Like indexes and materialized views, horizontal partitioning can have a significant impact on the performance of the database workload (i.e., queries and updates that execute against the database system) by enabling reduced cost of accessing and processing data. Thus, database administrators (DBAs) in today's enterprises are faced with the challenging task of determining the appropriate choice of physical design consisting of partitioned tables, indexes and materialized views for optimizing the performance of the workload.

Several database tuning tools have been developed to assist the DBA in selecting indexes and materialize views. U.S. Pat. No. 6,223,171 to Chaudhuri et al. discloses a "what if" analysis tool that allows the DBA to analyze the utility of a given configuration of indexes over the database workload. U.S. Pat. No. 6,226,658 to Adya et al. discloses an index tuning wizard for selecting indexes based on a workload. U.S. Pat. No. 6,366,903 to Agrawal et al. discloses a tuning wizard that recommends an optimal combination of indexes and materialized views for a given workload. These tuning tools use a hill climbing algorithm, referred to as Greedy(m,k), as the search strategy for selecting indexes and views to be recommended. Greedy(m,k) starts by enumerating all sets of size m from the candidate set. It chooses the optimal set of size m and then greedily (based on the additional benefit accrued given the current configuration) adds the indexes until the size of the set reaches k. The value of k is determined by storage constraints.

While existing tools are useful for selecting structures in a physical design configuration for a database, none of them integrate the partitioning aspect into the selection of structures.

SUMMARY OF THE INVENTION

Integrating the partitioning of physical design structures with the physical design process results in more efficient query execution. When candidate structures are evaluated for their relative benefit, one or more partitioning methods is associated with each structure so that the benefits of various partitioning methods are taken into consideration when the structures are selected for use by the database. A pool of partitioned candidate structures is formed by proposing and evaluating the benefit of candidate structures with associated partitioning on a per query basis. The selected partitioned candidates are then used to construct generalized structures with associated partitioning methods that are evaluated for their benefit over the workload. Those generalized structures are added to the pool of partitioned candidate structures. From this augmented pool of partitioned candidate structures, an optimal set of partitioned structures is enumerated for use by the database system. The space of possible structures can be limited by a preprocessing step that sets up constraints on the column-subsets that can be the basis for candidate structures.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENTS

Exemplary Operating Environment

Figure 1:
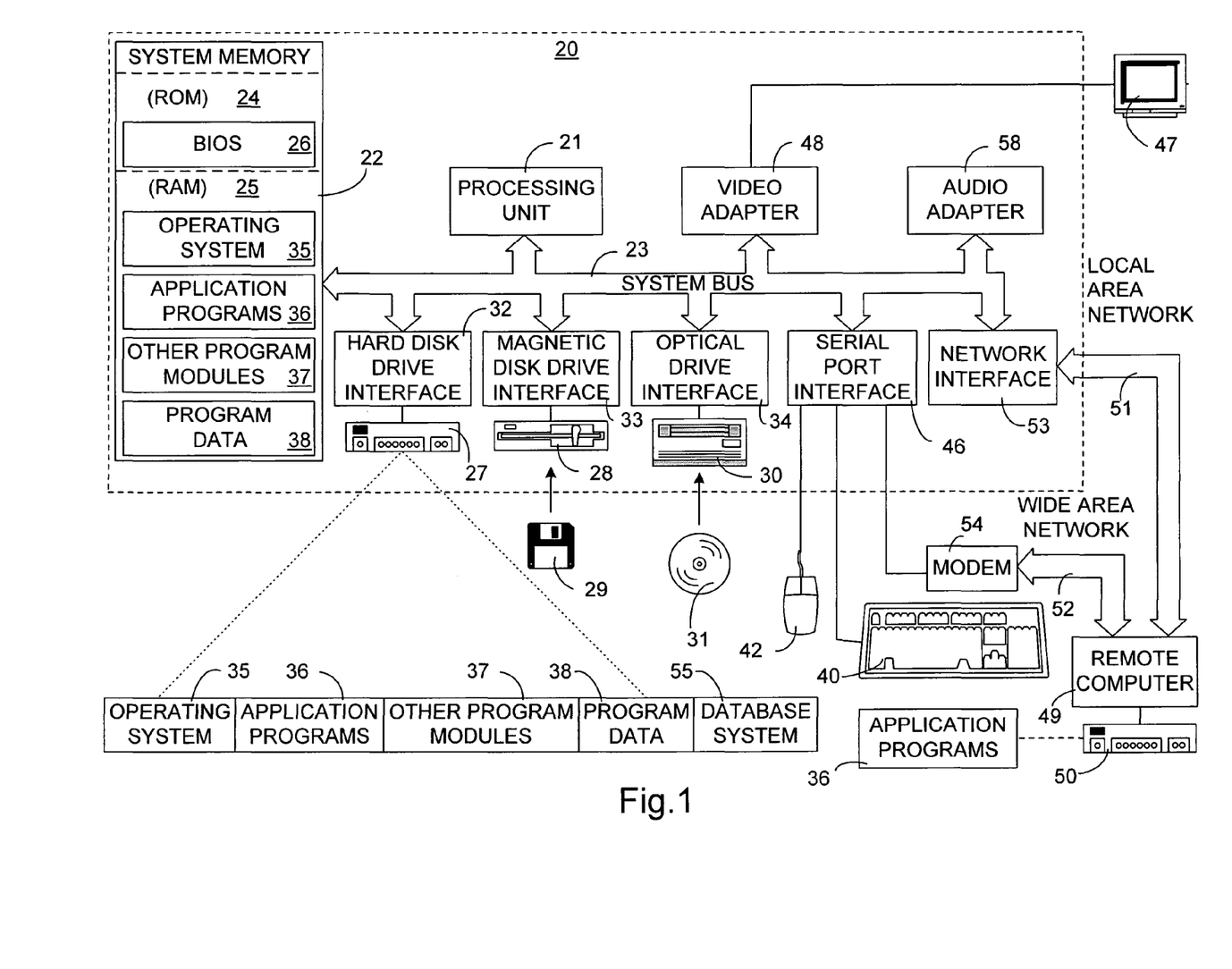
FIG. 1 illustrates an exemplary operating environment for a system for recommending a database design structure.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or partitions thereof, may be stored in remote memory storage device 50. It will be appreciated that the network connections shown are exemplary and other means of establishing a communications link between the computers may be used.

Integrating Partitioning with Physical Design Optimization

An integrated approach to automating the choice of physical design is important since the different aspects of the physical design such as indexes, materialized views, and horizontal partitioning can interact strongly with one another. The following example highlights the drawback of separating the selection of different physical design objects from the step of partitioning the objects.

Given query $Q_1$ of the TPC-H benchmark, where the grouping columns in the query are l_returnflag, l_linestatus, and that there is a range selection condition on the column l_shipdate, two possible design approaches are considered: (1) First select the best indexes for the query, and then horizontally partition the resulting physical design. (2) Consider indexes and horizontal partitioning together. Using the first approach, an index ($I_1$) is obtained on columns (l_shipdate, l_returnflag, l_linestatus, l_extendedprice, l_discount, l_tax) that is hash partitioned on (l_returnflag, l_linestatus). Using the second (integrated) approach the index ($I_2$) is obtained on columns (_returnflag, l_linestatus, l_shipdate, l_extendedprice, l_discount, l_tax) that is range partitioned on (l_shipdate). On a 1 GB database on Microsoft SQL Server, the execution time of $Q_1$ using $I_2$ is about 30% faster than when using $I_1$. Intuitively, the reason for the inferior performance using the first approach is that both indexes and horizontal partitioning can speed up the same operations in the query (grouping, selections etc.), and by separating the choices a poor solution in the first step cannot be subsequently undone.

Figure 2:
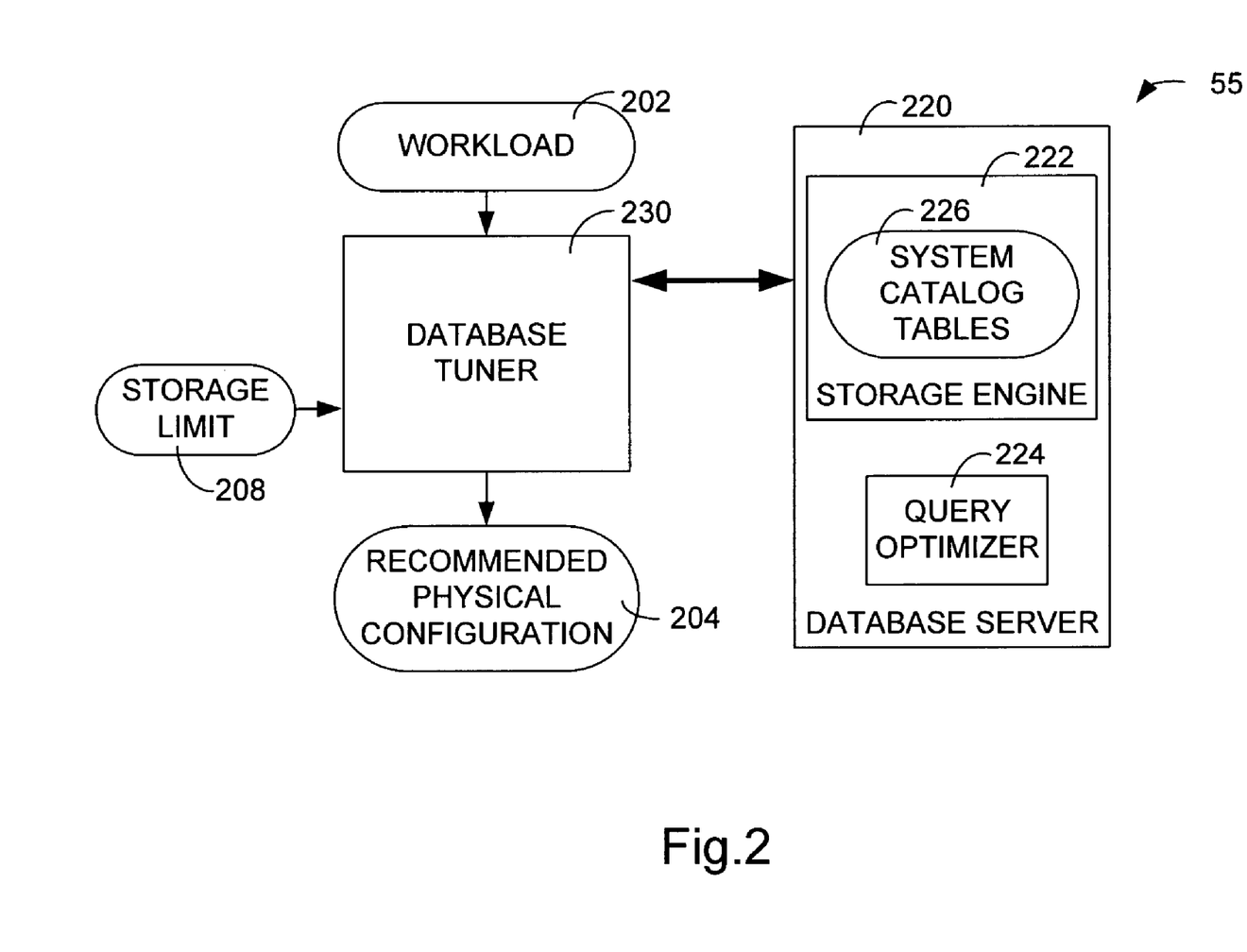
FIG. 2 is a block diagram of a database design tuner in accordance with an embodiment of the present invention.

FIG. 2 illustrates one example of a computer database system that includes a database design tuner 230 for recommending a database physical configuration for query optimization. The database system 55 comprises a database (not shown), a database server 220, and a database design tuner 230. Database system 55 manages the storage and retrieval of data in database in accordance with data manipulation statements or queries presented to database system 55 by a database application or by a user, for example.

The database comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database. Database system 55 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in the database. To enhance performance in processing queries, database server 220 uses indexes and materialized views, horizontal partitions, and/or other structures that may reside in system catalog tables 226 to help access data in the database more efficiently. This combination of indexes, materialized views, partitions, and other physical design structures is referred to as the physical configuration of the database system. Database server 220 comprises a query optimizer 224 to generate efficient execution plans for queries with respect to a set of indexes. In generating execution plans, query optimizer 224 relies on indexes or materialized views on column(s) of table(s) or tables(s) referenced in a query to estimate, for example, the cost in time to execute the query against the database using more than one possible execution plan for the query. Query optimizer 224 may then choose among possible execution plans for the query. As the database system is acted upon by users issuing queries and updates, it becomes necessary to update the physical configuration of the database. To perform database design tuning, a user inputs to the database design tuner 230 the amount of storage 208 that may be used to store a physical configuration. The database tuner outputs a recommended physical configuration 202.

Workload 202 may be any suitable set of one or more queries. Workload 202 may be, for example, a representative set of one or more queries to be executed against the database.

Workload 202 may be an organization specific representative workload used by a database administrator or a set of one or more queries identified by logging events at database server 220. Where database server 220 comprises the Microsoft® SQL Server, for example, the database administrator can use the SQL Server Profiler to log all queries that executed on database server 220 over the past week, for example. In addition, filters can be applied on a number of properties of the events in the log to select queries in accordance with a predetermined criteria. Queries that take at least one second to execute, for example, may be logged. Optionally, a weight $f_Q$ that denotes the importance of a statement Q in the workload may be associated with each statement in the workload. For example, the weight may capture the multiplicity of that statement in the workload.

The database design tuner 230 attempts to produce the best possible recommended physical configuration given the workload and the storage limits. As will be discussed in greater detail below, the tuner processes separate queries and considers the entire workload to arrive at a recommended configuration for the workload that includes horizontal partitioning for the objects in the recommended configuration.

Database server 220, storage engine 222, query optimizer 224, and database design tuner 230 are implemented for one example as program modules or computer-executable instructions and may be stored on any suitable computer-readable medium for execution in a suitable operating environment, such as the computing environment of FIG. 1 for example. The data of database 210 and system catalog tables 226 may be implemented in the form of one or more suitable data structures and may also be stored on any suitable computer-readable medium.

Horizontal partitioning is an important aspect of physical design that affects performance as well as manageability. In general, any access path in a database such as the table itself, a non-clustered index, or a materialized view can be partitioned. For the purposes of this description all of these access paths will be referred to as objects. The horizontal partitioning of an object is specified using a partitioning method, which maps a given row in an object to a partition number. All rows of the object with the same partition number are stored in the same partition. The present discussion will focus on the case of single-node partitioning where all objects reside on a single machine (possibly an SMP), multi-node partitioning can also bring benefits of availability in accordance with the present invention.

Today's database systems typically allow two main kinds of partitioning methods: hash or range. In hash partitioning, the partition number for a given row is generated by applying a system defined hash function on a specified set of partitioning columns of the object. A hash partitioning method is defined by a tuple (C,n), where C is a set of column tuples, and n is the number of partitions. For example, given table T ($c_1$ int, $c_2$ int, $c_3$ float, $c_4$ date) the hash partition method $H_1$=({int, int}, 10) partitions T into 10 partitions by applying the hash function to the values of columns $\{c_1,c_2\}$ in each row of T.

A range partitioning method is defined by a tuple (c,V), where c is a column type, and V is an ordered sequence of values from the domain of c. For example, the range partitioning method $R_1$=(date,<'01-01-98','01-01-00','01-01-02'>) when applied to column $c_4$ on table T above partitions table T into 4 partitions, one per range defined by the sequence of dates. It should be noted that the first range is defined by all values less than or equal to 01-01-98 and the last range is defined by all values greater than 01-01-02. For simplicity, range partitioning is defined over a single column rather than a set of columns. Other kinds of partitioning methods such as hybrid partitioning (consisting of range partitioning of the object with hash partitioning of each range), and list partitioning are not discussed herein but are contemplated by the present invention.

A physical design structure is defined as an object and its associated partitioning method. A physical design structure is denoted by (O,P,C) where O is an object (heap, index, materialized view), P is a partitioning method and C is the ordered set of columns of O on which P is applied. The physical design structure $(T,H_1,\{c_1,c_2\})$ therefore represents the table T partitioned by applying the partitioning method $H_1$ on columns $\{c_1,c_2\}$ of T.

A configuration is a valid set of physical design structures, i.e., a set of physical design structures that can be realized in a database. Examples of valid constraints that apply to any given configuration: (1) a table can have at most one clustered index and (2) a table can be horizontally partitioned in exactly one way.

Finally, an important concept related to horizontal partitioning is the notion of co-location of objects. Two structures $(O_1,P_1,C_1)$ and $(O_2,P_2,C_2)$ are considered to be co-located iff $P_1=P_2$. Co-location is important as it allows efficient execution plans for joins requiring two or more objects i.e., objects are partitioned on the join columns using the same partitioning method. Consider a query that involves an equi-join of two large tables. If the two tables are partitioned identically on their respective join columns, the query optimizer can select a plan that joins the corresponding partitions of the two objects separately, and then combine the results. Co-located joins, particularly on multi-processor systems, where joins of several different pairs of partitions can be much less than cost of a single large join. For example, when each partition fits into memory, the cost of join can decrease dramatically.

Given queries in the TPC-H benchmark, where the tables lineitem and orders are joined, if tables lineitem and orders are both partitioned using the hash partitioning method H=({int}, 10) on column sets {l_orderkey} and {o_orderkey} respectively, for a query that joins lineitem and orders using the join predicate (l_orderkey=o_orderkey), the query optimizer can select a plan in which each corresponding partition of the two objects can be separately joined. Co-locate joins such as this are typically much faster than non co-located joins.

In this description it is assumed that MAX-PARTITIONS represents the system defined limit on the number of partitions that can be defined in any partitioning method. Such a limit may be imposed for manageability reasons as well as to limit the amount of metadata per object. If the system does not impose such a limit, then MAX-PARTITIONS=∞.

Referring again to FIG. 2, the database tuner 230 recommends a physical design configuration such that the performance of the workload 202 faced by the database system is optimized, subject to a constraint on the total storage 208 allowed for the configuration. Given a statement Q in the workload, and a given configuration P it is assumed there exists a function Cost (Q,P) that returns the optimizer estimated cost of statement Q if the physical design of the database is P.

The process of integrating object partitioning with the selection of tables, indexes, and materialized views should involve an analysis of various interactions in order to arrive at an optimal design recommendation. The inclusion of horizontal partitioning can give rise to intra-query interactions such as join interactions and mutually exclusive structures. Inter-query interactions include variations in levels of specificity of structures and storage/update implications.

Intra-query interaction captures the impact of different physical design features on one another at the query processing level. For some queries it is helpful to construct an object on an intersection of conditions. For example, given a query with the WHERE clause Age<30 AND Salary>50K and the fact that neither condition is very selective, indexing or partitioning on Age and Salary conditions are not very useful. However if the conjunction of their selectivities small, e.g., an index on Salary partitioned on the Age column, can benefit the query significantly. This is another example that illustrates why an approach that separates the selection of indexes and partitioning is unable to recommend the optimal answer for the query. Similar interactions can also occur with two indexes (e.g., when the query processor indexes intersection plans).

In a join interaction, two or more structures from different tables can share a common property that enables a faster join execution strategy. For example, co-locating two (or more) structures can reduce an expensive equi-join into a set of smaller partition-wise equi-joins. This interaction requires exploration of combinations of structures that are used in the join for co-locations. In a single query, it is possible to have more than one co-located join, so multiple join interactions may need to be considered. Another example of a join interaction is having clustered indexes on the join columns of two tables being joined.

Mutually exclusive structures are characterized by the fact that if one structure is chosen, then it eliminates (or makes redundant) other structures from consideration. For example, if a column T is partitioned on column A, then it physically prohibits the table from being partitioned on any other column(s). Clustering of a table is another example of a structure that precludes the creation of another structure.

Inter-query interaction is considered because the goal of the database tuner is to find the best configuration for a given workload with certain resource constraints such as limited storage for physical design structures. Consideration of inter-query interactions includes avoiding overly specific structures. Often a structure is only useful for a specific query, but not useful for any other query in the workload. A good example of this is a range partitioned table. Unless the boundary values of the range partitioning are carefully selected, the objects may be overly specific for a few queries, but poor for the rest of the workload. Another example is a materialized view that is optimal for a given query (e.g., including specific selection conditions). If the selection conditions are even slightly different in other queries, then the materialized view may not be useful in answering those queries.

The consideration of specificity to workload is helpful when integrating the step of partitioning structures with the selection of structures, rather than selecting structures and then partitioning them. A workload having four queries $Q_1, \ldots, Q_4$ includes $Q_1$ and $Q_2$ that each contain a selection condition on column $c_1$, as well as one additional selection condition on column $c_2$ and $c_3$, respectively. The conditions on $c_2$, $c_3$ are slightly more selective than the corresponding conditions on $c_1$. Queries $Q_3$ and $Q_4$ each contain a single selection condition on column $c_4$ and $c_5$, respectively. If there is only enough storage for two indexes and indexes are selected first, followed by partitioning, then indexes on columns $c_2$ and $c_3$ would be chosen. Subsequent to index selection, partitioning of the table on column $c_4$ would be recommended (benefiting $Q_3$), but $Q_4$ would not be benefited by this selection. If the partitioning is considered at the same time indexes are chosen, the table would be partitioned on column $c_1$ (benefiting $Q_1$ and $Q_2$) and two indexes on column $c_4$ and $c_5$ would be selected (benefiting $Q_3$ and $Q_4$).

In addition, even though a given structure can be more beneficial than another structure it may consume more storage or can have higher update cost for the workload. Thus storage and update cost should be considered in the selection of structures.

Figure 3:
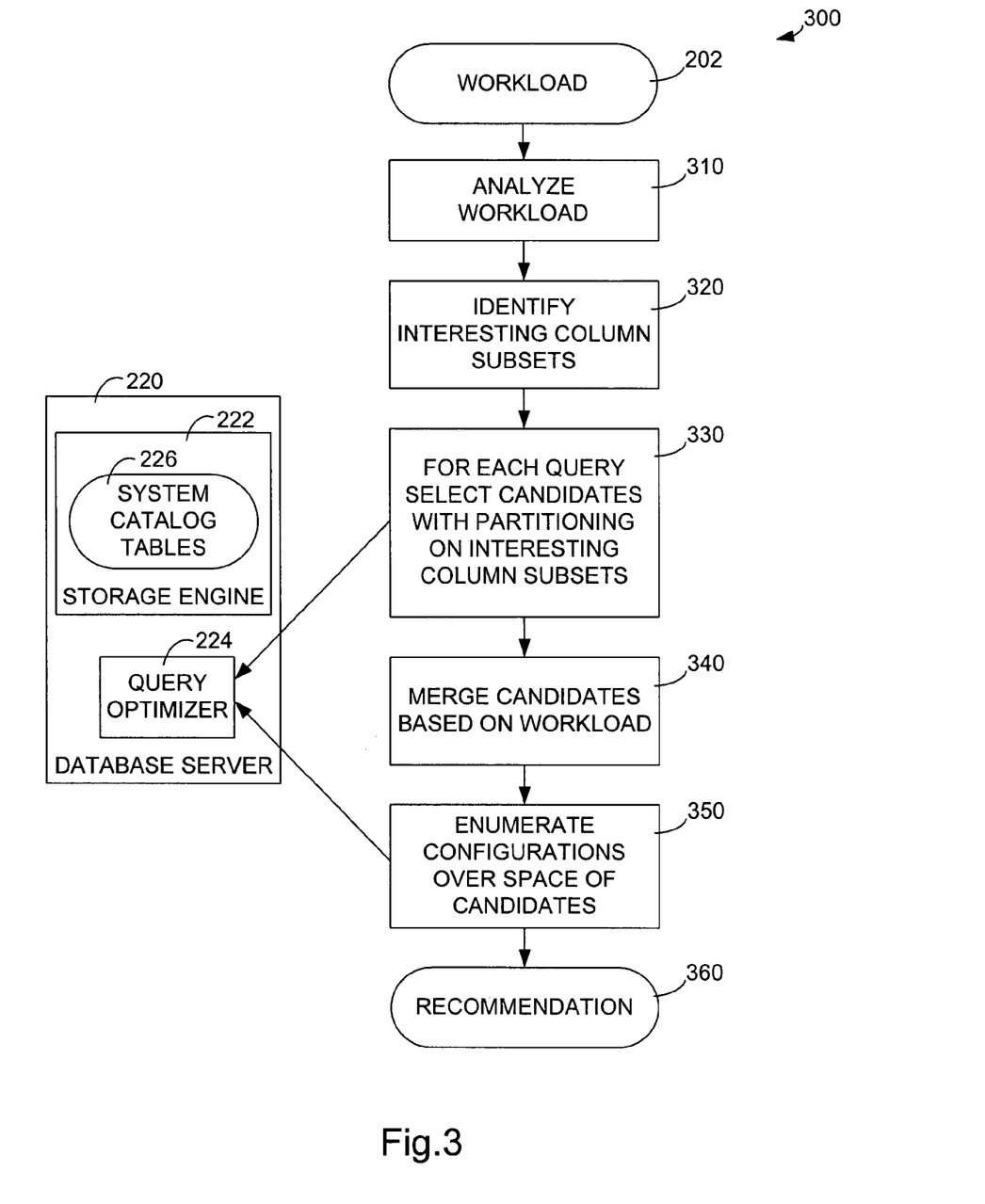
FIG. 3 is a flowchart of a method for recommending a database physical design configuration according to an embodiment of the present invention.

FIG. 3 illustrates an overview of a method 300 for enumerating a recommended design structure for a database given a workload. In step 310 the workload is analyzed and in step 320 interesting column subsets are identified. Then each query in the workload is examined and candidate structures based on the identified column subsets are selected that would be helpful for the query (step 330). In step 340 the candidate structures are merged based on the workload to generate additional structures for consideration and in step 350 a set of physical design structures is enumerated. Steps 330 and 350 can be employed by leveraging prior art index and materialized view selection techniques, such as Greedy(m,k) discussed in the background. However, the method described herein modifies the prior art algorithms to handle issues that arise due to the inclusion of horizontal partitioning in the tuning process such as the combinatorial explosion of potential structures when horizontal partitioning is considered during candidate selection and enumeration.

Column Group Restriction-Finding Interesting Column-Subsets

In principle, any column that occurs in a selection condition, join condition or GROUP BY clause of a query should be considered relevant for partitioning. Moreover, when more than one column occurs together (e.g., in multiple selection conditions), then partitioning each object on any subset of those columns may be beneficial for the query. Furthermore for every partitioned table/index considered, the partitioning may be achieved by many different hash or range partitioning methods. For example, if table T is hash partitioned on (A), in principle we would have to consider many different number of partitions (between 1 and MAX-PARTITIONS) in the hash partitioning method.

This combinatorial explosion in the number of physical design structures that must be considered is a result of the large number of column-groups (i.e., sets of columns) that are, in principle, interesting for the workload. To deal with this large set of column groups, a significant number of the column groups are eliminated from consideration that can at best have only a marginal impact on the final solution. The output of this step (step 320) is a set of "interesting" column groups for the workload.

The following example motivates the need to restrict the space of syntactically relevant structures considered for the workload, to those defined on interesting column-subsets. A given workload consists of ten queries $\{Q_1, \ldots, Q_{10}\}$ where each query contains selection conditions on columns A, B. Each query also contains selection conditions one additional selection condition, but each on a different column $C_1$ in $Q_1$, $C_2$ in $Q_2$, etc. Although there are a total for 43 possible column-subsets that are relevant for this workload, the column-subsets $\{A\}$, $\{B\}$, $\{A,B\}$ are significantly more important that the other column subsets since partitioning objects on these column-subsets can affect the cost of all queries in the workload, whereas partitioning on any of the other 40 column-subsets can affect only one query in the workload.

Based on this observation, a metric CG-Cost (g) is defined for a given column-group g that captures how interesting that column-group is for the workload. CG-Cost (g) is defined as the sum of the cost of all queries in the workload where column-group g is referenced. CG-Cost is monotonic; for column-groups $g_1$ and $g_2$, $g_1 \Rightarrow g_2 \subseteq$ CG-Cost$(g_1) \geq$ CG-Cost ($g_2$). This is because for all queries where $g_2$ is referenced, $g_1$ is also referenced, as are all other subsets of $g_2$. Thus for a column group to be frequent, all its subsets must be frequent. This monotonicity property is leveraged to build the set of all interesting column-groups of a workload in a scalable manner. A pseudo code representation of an algorithm for implementing CG-Cost is as follows. F is input to the algorithm as a threshold (e.g., expressed as a fraction of the total cost of the workload) below which a column-subset is not considered interesting, i.e., can be pruned out. MAX-COLUMNS, the largest size column-subset that can be considered, is input to the algorithm.

```
Let S₁ = {C}; i = 1
|C is a column-subset on table T of size 1 satisfying CS-Cost(T) ≧ F|
While i < MAX-COLUMNS and |Sᵢ| > 0
    i = i +1; Sᵢ={}
    Let G = {C}
    |C is a column-subset on table T of size i, and ∃ s ∈ Sᵢ₋₁
    such that s ⊂ C}
    For each C ∈ G
        If CS-Cost(C) ≧ F Then Sᵢ = Sᵢ ∪ {C}
    End For
End While
S = S₁ ∪ S₂ ∪...S_MAX-COLUMNS
Return S
```

The output of the Column-Group Restriction step 320 (FIG. 3) is a set of interesting column-groups for horizontal partitioning and indexes. Materialized views are evaluated using existing techniques, and interest views such as "frequent" sets of tables, are added to the pool of candidate structures. In step 330 candidate configurations are picked for each query in the workload. When considering sets of physical design structures for each Q, knowledge of interesting column-groups should be exploited as well as intra-query considerations.

Per Query Candidate Selection

All indexes and materialized views can be horizontally partitioned. In the candidate selection step, columns on which to partition each object and the specific partitioning method for the object are selected. The space of partitioning columns is restricted to the interesting column-groups that occur in selections, joins or grouping conditions. This is the same as the space of indexes except that the ordering of columns is not considered for partitions and the specific values present in selection condition, especially range conditions are needed for partitioning purposes.

When considering alternative ways to partition a particular structure (table/index/materialized view) for a given query, in practice it is sufficient to consider either hash partitioning methods or range partitioning methods but not both for that structure. The type of query under consideration often dictates the partitioning method that is most appropriate for a structure. For example, when single column involved in a range selection predicate is to be partitioned only range partitioning can potentially benefit the query. Likewise when a column that is involved in an equality selection predicate or an equi-join, then both range and hash partitioning can be equally effective for that query. In the described implementation only hash partition is considered for this case. When partitioning on more than one column (e.g., GROUP BY A, B), then only hash partitioning is applicable.

Even with restrictions imposed thus far on the types of indexes and materialized views that are considered, the combination of the space of available partitioning methods and partitioned objects can become prohibitively large. For example, a table T partitioned on column C can be partitioned into any number of hash partitions or range partitioned on any subset of domain value points of the column. Therefore, the space of partition methods must be restricted. For hash partitioning methods over a set of columns, the number of partitions for an object must be chosen. The number of partitions chosen depends on the following factors: (1) the number of processors on the server (a multiple of the number of processors is considered); (2) whether each partition can fit into available memory; and (3) the number of distinct values of the column-group on which partitioning is being performed.

When a hash partitioning method is used, in principle, the possible number of partitions ranges from one to MAX-PARTITIONS. Thus if the optimal number of partitions is sought, the query optimizer will need to be repeatedly invoked for each number, and the value that yield the lowest cost will be chosen. The number of alternative numbers of partitions that must be considered may be reduced by setting a lower bound on the number of partitions equal to the number of available processors and a upper bound on the number of partitions equal to the number of distinct values in the column-subset being partitioned. The lower bound is reasonable because operators on partitioned objects can be executed in parallel and therefore the number of partitions should take advantage of all available processors. However, it may be advantageous to consider a lower bound of 0 partitions. As for the upper bound, having more partitions than the number of distinct values in C is unlikely to give much benefit. If C has a large number of distinct values (relative to the cardinality of the table)—e.g., as in a primary-key, foreign-key join of two tables—choosing the number of partitions such that each partition fits entirely in memory is likely to yield good performance.

Based on these observations, the algorithm outlined in pseudo code below sets the minimum (LOWER) and maximum (UPPER) number of partitions and then performs a binary search between these two values to find the best number of partitions. The function FindSlopeSign(S,C,n) returns the sign of the slope (i.e., positive or negative) of the cost vs. number of partitions curve for the query, assuming that structure S is partitioned on C into n partitions. This is implemented by making two calls to the query optimizer with partitioning methods of (n−1) and (n+1) partitions respectively, and taking the mean. Thus the total number of optimizer calls made by this algorithm is logarithmic in the size of the interval(UPPER-LOWER). The algorithm is based on the following assumptions: (1) the cost of the operator for which the partitioned structure is being used varies in a piecewise linear manner as the number of partitions is varied between LOWER and UPPER; and (2) there is a unique minimum for the cost in this interval. These assumptions are reasonable since the common operators for which partitioning is used e.g., grouping, join initially exhibit near linear reduction in cost as the number of partitions is varied; and then remain flat (or slightly increased) as the number of partitions is further increased. The reason for the slight increase is due to the overhead of opening/closing a partition (which results in an additional random I/O access). It has been observed that often a small number of optimizer calls is sufficient to find a value of n having a cost close to that of the optimal number of partitions. In the algorithm, C is the column-subset on which hash partitioning of structure S is being considered.

```
LOWER = Number of available processors
UPPER = MIN (Num. Distinct values of C in S, Size(S)/Available
   Memory, MAX-PARTITIONS)
SlopeSign-L = FindSlopeSign(S,C,LOWER)
SlopeSign-U = FindSlopeSign(S,C,UPPER)
N = UPPER
While (UPPER–LOWER < 0)
   N = (LOWER + UPPER)/2
   SlopeSign-M = FindSlopeSign(Q,N)
   If (SlopeSign-N = SlopeSign-L)
      Then LOWER = N
      Else UPPER = N
   End If
End While
```

This algorithm can be extended for a query where two structures S1 and S2 (e.g., S1 and S2 are two tables covering indexes on the respective tables) are joined. If S1 and S2 are respectively partitioned on column-subsets C1 and C2 (which are the join columns), only hash partition methods on the structures being joined such that the resulting join is a co-located join are considered. This is because non-co-located joins are significantly more expensive since one of the structures involved in the join (typically the smaller structure) needs to be repartitioned at query execution time. Co-location implies that the number of partitions in the hash partition method of each table is identical. Thus the algorithm above is applicable with the following minor changes. UPPER is computed as MIN (MAX (Num. Distinct values in S1, Num. Distinct values in S2), (Size(S1)+Size(S2)/Available Memory, MAX-PARTITIONS). When evaluating the cost of Q, FindSlopeSign(Q,n) applies the number of partitions n to both structures S1 and S2.

An alternative heuristic algorithm for determining a number of partitions n for hash partitioning that does not involve any optimizer calls can be performed. Given an object having a size O and a maximum amount of memory that can be allocated per partition m, an iterative method is used that tries increasingly larger values for n that are multiples of the number of processors until that the size of the object O divided by n is less than the amount of memory allocated per partition. The algorithm stops when the first value of n that results in a partition that can fit in memory or when n is greater than MAX-PARTITIONS.

The case of range partitioning is simpler because a range partition method is considered only for range selection predicates in the query and only on single columns. The partitioning method is simply (c,V) where c is the column on which the range condition is defined, and V is an ordered sequence of all boundary values of ranges over c specified in the query. For example, if the query contains the following WHERE clause: (c between 0 and 10) OR (c BETWEEN 5 and 20), the partitioning method considered is (c,<0,5,10,20>).

For horizontal partitioning of a materialized view, the manner in which the view can be used to answer query is considered. If the view needs to be joined with some other table (or view), partitioning on the join columns is considered. Similarly, if grouping or selections need to be performed on the view, those specific columns again become important. Thus, the considerations are the same as for tables. If a view is highly specific to a query (e.g., same as the query itself), then partitioning of that view is not likely to be useful. However for more general views partitioning becomes important. For example, if the general view has the selection columns "pushed" as grouping/projection columns of the view, partitioning of the view on the grouping/projection columns can become important and is considered during the merging step 340 (FIG. 3).

If S is the set of syntactically relevant structures considered for a query Q, then the candidates for Q are determined by invoking a function FindBestConfiguration(Q,S), that returns a configuration (i.e., the subset of structures in S) that minimizes the cost of Q. FindBestConfiguration has the property that the choice of the best configuration for the query is cost based (i.e., it returns the configuration with the lowest optimizer estimated cost for the query). This is shown schematically in FIG. 3 as the arrows between steps 330 and 350 and the query optimizer. Any suitable search method can be used inside FindBestConfiguration. The algorithm Greedy(m,k), as discussed in the background, is employed by the described embodiment to choose an optimal set of physical structures from the space of syntactically relevant structures. The cost for a configuration used during this search is obtained by consulting the query optimizer using "what-if" interfaces in the database server. In this step, interactions between various objects are considered. For partitioning, co-location plays an integral part; objects that are joined in the query are partitioned using the same partitioning method on the join column(s). Each object participating in a join may have multiple interesting partitioning methods on which to co-locate. For example, given a query that has conditions A.C=B.C and A.C<10 and B.C>20, co-location of A and B using range partitioning as well as hash partitioning on column C would be considered. To account for the interactions due to co-location, a value of m in the Greedy(m,k) algorithm is chosen to be at least as large as the largest number of co-located objects for that query.

Merging Candidate Structures

Limiting the set of candidates that enter the enumeration step (350) to candidates chosen in the per query candidate selection step may result in less than optimal physical design. Because an object can be partitioned in exactly one way, it is important that the best partitioning method is selected for the object. Therefore the set of candidate structures that result from the per query candidate selection step are augmented with structures that are more widely applicable across queries in the workload. Additional candidate structures are constructed by combining the existing candidate structures in a process called merging.

The inclusion of horizontal partitioning introduces challenges during merging. First, it is not sufficient to simply merge the objects (e.g., indexes) themselves, but the associated partitioning methods must also be merged. This is non-trivial because the method of merging may depend on the partitioning method and vice versa. For example, given two indexes: $I_1$ that is an index on column A hash partitioned on column B and $I_2$ is an index on column A hash partitioned on C. If the indexes and partitioning methods were merged separately, the potentially useful structure of an index on (A,B) partitioned on C would be missed. The underlying reason for this problem is that the indexing columns and the partitioning columns can be interchangeably used.

When merging two structures, the fact that structures being merged may be co-located must be considered. Thus if the partitioning method is not retained in the merged structure, the benefit of partitioning the merged structure may be significantly diminished (to the extent that the merged structure is no longer useful). For example, a table $T_1$ has two indexes: $I_1$=((A,B,D), ({int,10}, {C}) and $I_2$=(A,B,E), ({int},40), {C}) and n=10. $I_1$ is used as a covering index in a co-located join with table $T_2$ in query Q, i.e., the join predicate is $T_1.C=T_2.C'$.

Thus, table $T_2$ may be partitioned, e.g., as $(T_2, (\{int\},10), \{C'\})$. Since the number of partitions of $I_1$ and $T_2$ are the same, the query optimizer can choose a plan involving a co-located join. However, if a merged index $I_{12}$ is constructed such that $I_{12}=((A,B,D,E),(\{int\},n), \{C\})$, where n=10, then the query optimizer will not be able to choose a co-located join involving $I_{12}$ and $T_2(\{C'\}, 10)$. Therefore the merged structure $((A,B,D,E),\{int\},10), \{C\})$ should be considered as well as $((A,B,D,E),(\{int\}, 40), \{C\})$ if $I_2$ itself is involved in one or more co-located joins.

An additional consideration is that when merging two partitioning methods, the number of possible merged partitioning methods is very large. For example, a table T has $I_1=((A), (\{int\},10), \{B\})$ and $I_2=((A), (\{int\},50), \{B\})$. In principle any of the following merged structures may be optimal for the workload: $((A), (\{int\},n), \{B\})$, where $n \in [10 \ldots 50]$.

An important aspect of generating new merged candidates is defining the space of merged candidates explored. Given a set of structures, called parent structures, the goal is to generate a set of merged structures, each of which satisfies the following criteria. First, for all queries where each parent structure was used in answering the query, the merged structure should also be usable in answering those queries. Second, the cost of answering queries using the merged structure should not be much higher than the cost of answering queries using the parent structures. To explore the space of merged structures, the set of parent candidates is iteratively considered. In each iteration all candidates that can be obtained by merging each pair of candidates are generated. The best merged structure is added to the candidates and the candidates from which the best merged structures are derived are removed from the pool and the next iteration is performed. Thus the "maximal" merged structures that can be obtained by repeatedly merging pairs of structures is returned.

The following pseudo code illustrates a method for merging two horizontally partitioned indexes.

partitioned on (A) can be used to answer both queries (partial grouping). In addition, the original column-groups (i.e., $C_1$ and $C_2$) must also be considered. Steps 5-6 and Steps 7-8, respectively, describe how the exact range or hash partitioning method of the merged indexes are chosen. These are described in more detail below. Since the input indexes to the algorithm could themselves be the result of previous merges, the Parent-Closure(X) function returns the original (unmerged) set of parents from which the structure X is derived. Thus in Step 9, a merged structure is prevented from becoming much larger in size than its original parents. If $P=\phi$ or $C_X=\phi$ during the merge, the resulting merged object is unpartitioned. Also, if two objects can not be merged, then indexes $((O_1 \oplus C_1 \oplus O_2 \oplus C_2), \phi,\phi)$ and $((O_2 \oplus C_2 \oplus O_1 \oplus C_1), \phi,\phi)$ can be considered.

This technique can be generalized to merge two objects $O_1$ and $O_2$ given the following preconditions: (1) If $O_1$ is a table, then $O_2$ must be a table, (2) If $O_1$ is an index on table T, then $O_2$ must also be an index on table T. (3) If $O_1$ is a materialized view, then $O_2$ must also be a materialized view defined on the same set of tables as $O_1$ and must have the same join conditions as $O_1$.

Given a pair of range partitioning methods $P_1=(S,V_1)$, $P_2=(S,V_2)$, a partitioning method $P_{12}=(S,V_{12})$ is sought to be used with the merged object $O_{12}$. The best partitioning method is one such that the cost of all queries answered using $(O_1,P_1,C)$ (denoted by the set $R_1$) as well as $(O_2,P_2,C)$ (denoted by the set $R_2$) increases as little as possible when answered using $(O_{12},P_{12},C)$. The naive approach of considering all possible partitioning methods $P_{12}$ that can be generated by considering any subset of the values in $V_1 \cup V_2$ is infeasible in practice.

If an index is not partitioned, all queries need to scan the entire index resulting in high scan cost, but only a small cost is incurred in opening/closing the single B+-tree. At the other extreme, if the index is partitioned into as many partitions as

---

Input: Indexes $I_1 = (O_1,P_1,C_1)$, $I_2 = (O_2,P_2,C_2)$
Output: Set of merged indexes R
1.    Let $O_A=(O_1 \oplus O_2)$; $O_B=(O_2 \oplus O_1)$; $O_C=(O_1 \oplus C_1 \oplus O_2)$; $O_D=(O_2 \oplus C_2 \oplus O_1)$
     //Determine column-groups on which to partition
2.    $C_X = C_1 \cap C_2$; $C_Y = C_1$; $C_Z = C_2$
3.    //Determine HASH or RANGE partitioning methods
4.    If P1.Type = RANGE Then
5.      Let $P_{12}$ = MergeRanges($P_1$,$P_2$)
6.      M = $\{(O_A, P_{12}, C_X), (O_B, P_{12}, C_X), (O_C, P_2, C_Z), (O_D, P_1, C_Y)\}$
7.    Else // Type = HASH
8.      M = $\{(O_A,\$P,C_X), (O_B,\$P,C_X), (O_C,\$P,C_Z), (O_D,\$P,C_Y)\}$
     //where $P depends on specific object size, memory and #CPUs.
9.    R = $\{m \in M \mid |m| \leq x *$ Min Size(Parent-Closure($O_1,P_1,C_1$)
     Parent-Closure($O_2,P_2,C_2$)) $\}$

---

The algorithm above merges two horizontally partitioned indexes. It assumes that the indexes are on the same table. Step 1 determines the possible objects that can result from merging. The operator $\oplus$ denotes appending columns; e.g., (A,C) (A,D) gives rise to (A,C,D) and (A,D) (A,C) gives rise to (A,D,C). The partitioning columns of an index can become index columns of the merged index (e.g., $O_C$ and $O_D$). Step 2 determines the possible column-groups on which merged indexes may be partitioned. $C_X$, defined as the intersection of the partitioning columns of $I_1$ and $I_2$, is a more "general" partitioning. For example, table T is partitioned on (A,B) and is used to answer a query on T with a GROUP BY A,B clause and the table is partitioned on (A,C) and used to answer a different query on T with a GROUP BY A,C clause. Then, T the number of distinct values, each query can be served by scanning the least amount of data required, but may access a large number of partitions, resulting in high cost of opening/closing partitions. Both these extremes can be sub-optimal. The scan and partition opening/closing costs must therefore be balanced.

The algorithm MergeRanges finds a merged range partitioning method for a merged object. The cost of scanning a range partitioned access method, denoted Cost-Range, is modeled for any range query Q as follows: (1) The cost of scanning a subset of partitions necessary to answer Q. This cost is proportional to the total size of all the partitions that must be scanned. (2) A fixed cost per scanned partition corresponding to the CPU and I/O overhead of opening and closing the B+-Tree for that partition. Computing Cost-Range $(Q,(O_{12},(S,V_{12}),C))$ is minimized where $R_1$ (resp. $R_2$) is the set of queries for which the input objects are candidates. The scheme finds the best merged range partition method starting with $V_{12}$ which is a simple merging of sequences $V_1$ and $V_2$. In each iteration, the algorithm merges the next pair of adjacent intervals (from among all pairs) that reduces Cost-Range the most. The algorithm stops when merging intervals no longer reduces Cost-Range.

Figure 4:
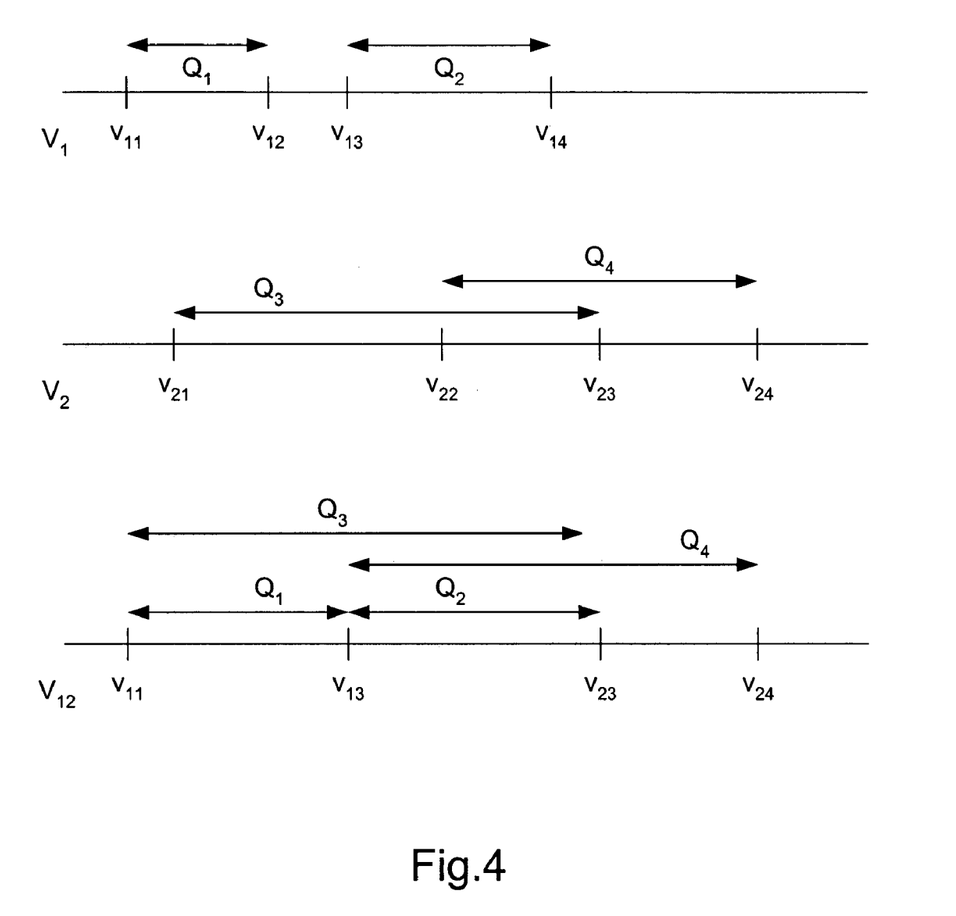
FIG. 4 is a schematic representation of a method for merging two range partitioned structures according to an embodiment of the present invention.

Referring now to FIG. 4, two range partition methods $P_1$ and $P_2$ are shown. For simplicity, it is assumed that the size of each partition is proportional to the length of the segment shown in the figure. Both $V_1$ and $V_2$ consist of 5 partitions and the goal is to find the best $V_{12}$ consisting of 5 partitions. Merging the intervals $[v_{11},v_{21}]$ and $[v_{21},v_{12}]$ (i.e., eliminating the boundary point $v_{21}$) is better than merging $[v_{14},v_{23}]$ and $[v_{23},v_{24}]$ (i.e., eliminating boundary point $v_{23}$) because the latter merging increases the cost of $Q_2$ significantly, whereas the former merging increases the cost of $Q_3$ by a much smaller amount.

A pair of objects $(O_1,P_1,C)$ and $(O_2,P_2,C)$ are merged where $P_1$ and $P_2$ are hash partitions on C with a number of partitions $n_1$ and $n_2$, respectively. The number of partitions of the merged object $O_{12}$ is determined by the number of processors, available memory and number of distinct values in C. Either technique for determining the number of partitions for a hash object discussed above can be adapted to generate numbers of partitions for the merged object $O_{12}$.

An additional consideration in merging is that of co-location. For example, two candidate indexes $I_1$ and $I_2$ on table $T_1$ are to be merged. $I_1$ is used in a co-located join with index $I_{23}$ on table $T_2$, i.e., both $I_1$ and $I_2$ get merged to produce $I_{12}$ with a partitioning method $P_{12}$. Since $P_{12}$ is potentially different from $P_1$, the merged index $I_{12}$ can no longer be used in a co-located join with $I_3$, thereby greatly reducing its benefit. Thus to preserve the benefits of co-location, a merged structure $I_{12}$ partitioning on $P_1$ should be considered. In general, for each merged object O, all partitioning methods of any other object that could be used in a co-location join with O should be considered.

Partitioning for Manageability

One of the important aspects of partitioning is that is can be used to improve manageability of the database. For example, if a table and all indexes on the table are aligned (i.e., use the same partitioning method), then backup and restoration of the table and its indexes becomes simpler. Partitioning can also make it easier to load new data and delete old data when the table is range partitioned on column of type time (e.g., the table is partitioned by month). The described solution to the physical design problem accommodates this aspect of partitioning as follows: (1) the user has the option of specifying that all indexes that are recommended should be aligned with the corresponding table over which the index is defined. (2) the user may specify as a constraint a set of structures (partitioned tables/indexes/materialized views) that must be included in the final solution.

These two options do not require modification of the algorithms described herein. The effect they have is to constrain the space of alternatives that are considered. Option (1) restricts the space of alternatives in the steps of choosing best configuration for a query, merging, and searching to aligned structures only. Option (2) causes the final solution to include the specified structures and therefore influences the candidates that are picked for each query.

It can be seen from the foregoing description that evaluating partitioning methods as part of the selection of physical design structures can result in a pool of structures that are useful for execution of a wide range of queries experienced by the database. Although the present invention has been described with a degree of particularity, it is the intent that the invention include all modifications and alterations from the disclosed design falling within the spirit or scope of the appended claims.

We claim:

1. For use with a database system having a workload comprising a set of queries that have been executed on the database, a method for selecting a set of partitioned physical database structures for access by the database system in executing queries comprising the steps of:
    compiling a pool of horizontally partitioned candidate structures by:
        for each query, determining potentially relevant structures and associating at least one horizontal partitioning method with each structure;
        selecting potentially relevant structures with associated horizontal partitioning methods to add to the pool of partitioned candidate structures;
        augmenting the pool of partitioned candidate structures by determining generalized partitioned structures that are relevant over a set of queries in the workload and adding them to the pool of partitioned candidate structures, wherein determining generalized partitioned structures is performed by merging partitioned structures in the pool of partitioned candidate structures and merging the horizontal partitioning methods associated with the partitioned structures in the pool;
        enumerating a set of horizontally partitioned physical structures from the pool of partitioned candidate structures.

2. The method of claim 1 comprising the step of examining the workload to form a set of constraints on structures that are added to the pool of partitioned candidate structures.

3. The method of claim 2 wherein the set of constraints is a set of column-subsets on which structures can be partitioned.

4. The method of claim 3 wherein the set of column-subsets is generated by evaluating a total cost of all queries in the workload that reference a given column-set and selecting column-sets that have a relatively high total cost of queries.

5. The method of claim 1 wherein the step of associating at least one partitioning method with each potentially relevant structure is performed by evaluating the query and associating a range partitioning method with the potentially relevant structure if the query comprises a range selection predicate on a single column.

6. The method of claim 5 wherein the range partitioning method is specified as the single column in the range selection predicate and an ordered sequence of all boundary values of ranges over the single column.

7. The method of claim 1 wherein the step of associating at least one partitioning method with each potentially relevant structure is performed by associating a hash partitioning method with the potentially relevant structure.

8. The method of claim 7 wherein the hash partitioning method is specified by a set of column types and a number of partitions.

9. The method of claim 8 wherein the number of partitions is calculated by iteratively evaluating the cost of executing the query with numbers of partitions that range between upper and lower partition number limits and selecting the number of partitions that has the lowest cost.

10. The method of claim 9 wherein the upper limit is a number of distinct values in a column-subset being partitioned.

11. The method of claim 9 wherein the lower limit is a number of processors in the database system.

12. The method of claim 9 wherein the lower limit is one.

13. The method of claim 9 comprising the step of rejecting any number of partitions that results in a partition that exceeds an amount of available memory.

14. The method of claim 9 comprising the step of rejecting any number of partitions that results in a number of partitions that exceeds a preset partition number limit.

15. The method of claim 9 wherein a plurality of potentially relevant structures are joined for the query and wherein the hash partitioning method associated with each of the potentially relevant structures comprises an identical number of partitions.

16. The method of claim 15 wherein the upper partition number limit is the minimum of the following values: the maximum number of distinct values in one of the plurality of potentially relevant structures, the combined size of the plurality of potentially relevant structures divided by available memory, or a maximum number of partitions allowed by the database system.

17. The method of claim 1 wherein the step of selecting potentially relevant structures with associated partitioning methods is performed by selecting a set of potentially relevant structures that returns a lowest optimizer estimated cost for the query.

18. The method of claim 1 wherein the step of merging partitioned structures is performed by recursively pair wise merging all the partitioned structures in the pool, selecting a merged structure that provides a highest cost benefit with respect to the workload, adding the selected merged structure to the set of partitioned candidate structures, removing the partitioned structures that were merged to form the selected merged structure from the pool, and returning to the pair wise merging step.

19. The method of claim 1 wherein the step of merging partitioned structures is performed by associating at least one partitioning method with each merged partitioned structure.

20. The method of claim 19 wherein the partitioned candidate structures being merged all have range partitioning methods and wherein the partitioning method associated with the merged partitioned structure is determined by determining the range partitioning method for the merged structure that results in the lowest total cost of evaluating all queries to which the merged partitioned structure is relevant.

21. The method of claim 20 wherein the cost of evaluating all queries is computed by: estimating a cost of scanning a subset of partitions required to answer each query based on a size of partitions being scanned and assigning a fixed cost for accessing any partition in answering the query to accumulate a total cost for each query.

22. The method of claim 19 wherein the step of associating a partitioning method with a merged structure is performed by associating a partitioning method identical to one associated with another structure that is relevant to a query that the merged structure is relevant to.

23. The method of claim 1 wherein a user imposes a constraint that any potentially relevant structure must have a partitioning method associated with it that is identical to a partitioning method of the table that the structure references.

24. The method of claim 19 wherein the partitioned candidate structures being merged all have range partitioning methods and wherein the partitioning method associated with the merged partitioned structure is determined by selecting a range partition method based on one of the queries in the workload.

25. The method of claim 8 wherein the number of partitions is calculated by iteratively evaluating numbers of partitions that are multiples of a number of processors on the database system and determining a minimum number of partitions that results in a partition size less than or equal to an amount of memory allocated for partition storage.

26. For use with a database system having a workload comprising a set of queries that have been executed on the database, a computer readable storage medium having computer executable steps stored thereon for performing method steps for selecting a set of partitioned physical database structures for access by the database system in executing queries, the method steps comprising:
compiling a pool of horizontally partitioned candidate structures by:
for each query, determining potentially relevant structures and associating at least one horizontal partitioning method with each structure;
selecting potentially relevant structures with associated horizontal partitioning methods to add to the pool of partitioned candidate structures;
augmenting the pool of partitioned candidate structures by determining generalized partitioned structures that are relevant over a set of queries in the workload and adding them to the pool of partitioned candidate structures, wherein determining generalized partitioned structures is performed by merging partitioned structures in the pool of partitioned candidate structures and merging the horizontal partitioning methods associated with the partitioned structures in the pool;
enumerating a set of horizontally partitioned physical structures from the pool of partitioned candidate structures.

27. The computer readable storage medium of claim 26 comprising the step of examining the workload to form a set of constraints on structures that are added to the pool of partitioned candidate structures.

28. The computer readable storage medium of claim 27 wherein the set of constraints is a set of column-subsets on which structures can be partitioned.

29. The computer readable storage medium of claim 28 wherein the set of column-subsets is generated by evaluating a total cost of all queries in the workload that reference a given column-set and selecting column-sets that have a relatively high total cost of queries.

30. The computer readable storage medium of claim 26 wherein the step of associating at least one partitioning method with each potentially relevant structure is performed by evaluating the query and associating a range partitioning method with the potentially relevant structure if the query comprises a range selection predicate on a single column.

31. The computer readable storage medium of claim 30 wherein the range partitioning method is specified as the single column in the range selection predicate and an ordered sequence of all boundary values of ranges over the single column.

32. The computer readable storage medium of claim 26 wherein the step of associating at least one partitioning method with each potentially relevant structure is performed by associating a hash partitioning method with the potentially relevant structure.

33. The computer readable storage medium of claim 32 wherein the hash partitioning method is specified by a set of column types and a number of partitions.

34. The computer readable storage medium of claim 33 wherein the number of partitions is calculated by iteratively evaluating the cost of executing the query with numbers of partitions that range between upper and lower partition number limits and selecting the number of partitions that has the lowest cost.

35. The computer readable storage medium of claim 34 wherein the upper limit is a number of distinct values in a column-subset being partitioned.

36. The computer readable storage medium of claim 34 wherein the lower limit is a number of processors in the database system.

37. The computer readable storage medium of claim 34 wherein the lower limit is one.

38. The computer readable storage medium of claim 34 comprising the step of rejecting any number of partitions that results in a partition that exceeds an amount of available memory.

39. The computer readable storage medium of claim 34 comprising the step of rejecting any number of partitions that results in a number of partitions that exceeds a preset partition number limit.

40. The computer readable storage medium of claim 34 wherein a plurality of potentially relevant structures are joined for the query and wherein the hash partitioning method associated with each of the potentially relevant structures comprises an identical number of partitions.

41. The computer readable storage medium of claim 40 wherein the upper partition number limit is the minimum of the following values: the maximum number of distinct values in one of the plurality of potentially relevant structures, the combined size of the plurality of potentially relevant structures divided by available memory, or a maximum number of partitions allowed by the database system.

42. The computer readable storage medium of claim 26 wherein the step of selecting potentially relevant structures with associated partitioning methods is performed by selecting a set of potentially relevant structures that returns a lowest optimizer estimated cost for the query.

43. The computer readable storage medium of claim 26 wherein the step of merging partitioned structures is performed by recursively pair wise merging all the partitioned structures in the pool, selecting a merged structure that provides a highest cost benefit with respect to the workload, adding the selected merged structure to the set of partitioned candidate structures, removing the partitioned structures that were merged to form the selected merged structure from the pool, and returning to the pair wise merging step.

44. The computer readable storage medium of claim 26 wherein the step of merging partitioned structures is performed by associating at least one partitioning method with each merged partitioned structure.

45. The computer readable storage medium of claim 44 wherein the partitioned candidate structures being merged all have range partitioning methods and wherein the partitioning method associated with the merged partitioned structure is determined by determining the range partitioning method for the merged structure that results in the lowest total cost of evaluating all queries to which the merged partitioned structure is relevant.

46. The computer readable storage medium of claim 45 wherein the cost of evaluating all queries is computed by: estimating a cost of scanning a subset of partitions required to answer each query based on a size of partitions being scanned and assigning a fixed cost for accessing any partition in answering the query to accumulate a total cost for each query.

47. The computer readable storage medium of claim 44 wherein the step of associating a partitioning method with a merged structure is performed by associating a partitioning method identical to one associated with another structure that is relevant to a query that the merged structure is relevant to.

48. The computer readable storage medium of claim 26 wherein a user imposes a constraint that any potentially relevant structure must have a partitioning method associated with it that is identical to a partitioning method of the table that the structure references.

49. The computer readable storage medium of claim 44 wherein the partitioned candidate structures being merged all have range partitioning methods and wherein the partitioning method associated with the merged partitioned structure is determined by selecting a range partition method based on one of the queries in the workload.

50. The computer readable storage medium of claim 33 wherein the number of partitions is calculated by iteratively evaluating numbers of partitions that are multiples of a number of processors on the database system and determining a minimum number of partitions that results in a partition size less than or equal to an amount of memory allocated for partition storage.

51. For use with a database system having a workload comprising a set of queries that have been executed on the database, an apparatus for selecting a set of partitioned physical database structures, comprising:
at least one memory;
at least one processing unit;
a candidate accumulator that compiles a pool of horizontally partitioned candidate structures comprising:
a structure partitioner that, for each query, determines potentially relevant structures and associates at least one horizontal partitioning method with each structure;
a structure selector for selecting potentially relevant structures with associated horizontal partitioning methods to add to the pool of partitioned candidate structures;
a structure constructor for augmenting the pool of partitioned candidate structures by determining generalized partitioned structures that are relevant over a set of queries in the workload and adding them to the pool of partitioned candidate structures, wherein the structure constructor merges partitioned structures in the pool of partitioned candidate structures and merges the horizontal partitioning methods associated with the partitioned structures in the pool to augment the pool of candidates;
a candidate set enumerator for enumerating a set of horizontally partitioned physical structures from the pool of partitioned candidate structures.

52. The apparatus of claim 51 comprising a workload analysis to for examining the workload to form a set of constraints on structures that are added to the pool of partitioned candidate structures.

53. The apparatus of claim 52 wherein the set of constraints is a set of column-subsets on which structures can be partitioned.

54. The apparatus of claim 51 wherein the structure partitioner associates at least one partitioning method with each potentially relevant structure by evaluating the query and associating a range partitioning method with the potentially relevant structure if the query comprises a range selection predicate on a single column.

55. The apparatus of claim 51 wherein the structure partitioner associates at least one partitioning method with each potentially relevant structure by associating a hash partitioning method with the potentially relevant structure.

56. The apparatus of claim 51 wherein the structure selector selects potentially relevant structures with associated partitioning methods by selecting a set of potentially relevant structures that returns a lowest optimizer estimated cost for the query.

57. For use with a database system having a workload comprising a set of queries that have been executed on the database, an apparatus for selecting a set of partitioned physical database structures, comprising:

- at least one memory;
- at least one processing unit;
- means for compiling a pool of horizontally partitioned candidate structures comprising:
  - means for determining, for each query, potentially relevant structures;
  - means for associating at least one horizontal partitioning method with each determined structure;
  - means for selecting potentially relevant structures with associated horizontal partitioning methods to add to the pool of partitioned candidate structures;
  - means for augmenting the pool of partitioned candidate structures by determining generalized partitioned structures that are relevant over a set of queries in the workload and adding them to the pool of partitioned candidate structures, wherein the means for augmenting the pool of candidates merges partitioned structures in the pool of partitioned candidate structures and merges the horizontal partitioning methods associated with the partitioned structures in the pool to augment the pool of candidates;
- means for enumerating a set of horizontally partitioned physical structures from the pool of partitioned candidate structures.

58. The apparatus of claim 57 comprising means for examining the workload to form a set of constraints on structures that are added to the pool of partitioned candidate structures.

59. The apparatus of claim 58 wherein the set of constraints is a set of column-subsets on which structures can be partitioned.

60. The apparatus of claim 57 wherein the means for associating at least one partitioning method associates at least one partitioning method with each potentially relevant structure by evaluating the query and associating a range partitioning method with the potentially relevant structure if the query comprises a range selection predicate on a single column.

61. The apparatus of claim 57 wherein the means for associating at least one partitioning method associates at least one partitioning method with each potentially relevant structure by associating a hash partitioning method with the potentially relevant structure.

62. The apparatus of claim 57 wherein the means for selecting structures selects potentially relevant structures with associated partitioning methods by selecting a set of potentially relevant structures that returns a lowest optimizer estimated cost for the query.

* * * * *